June 26, 1928.
A. F. MASURY
1,674,685
OILING SYSTEM FOR INTERNAL COMBUSTION ENGINES
Filed Oct. 15, 1925
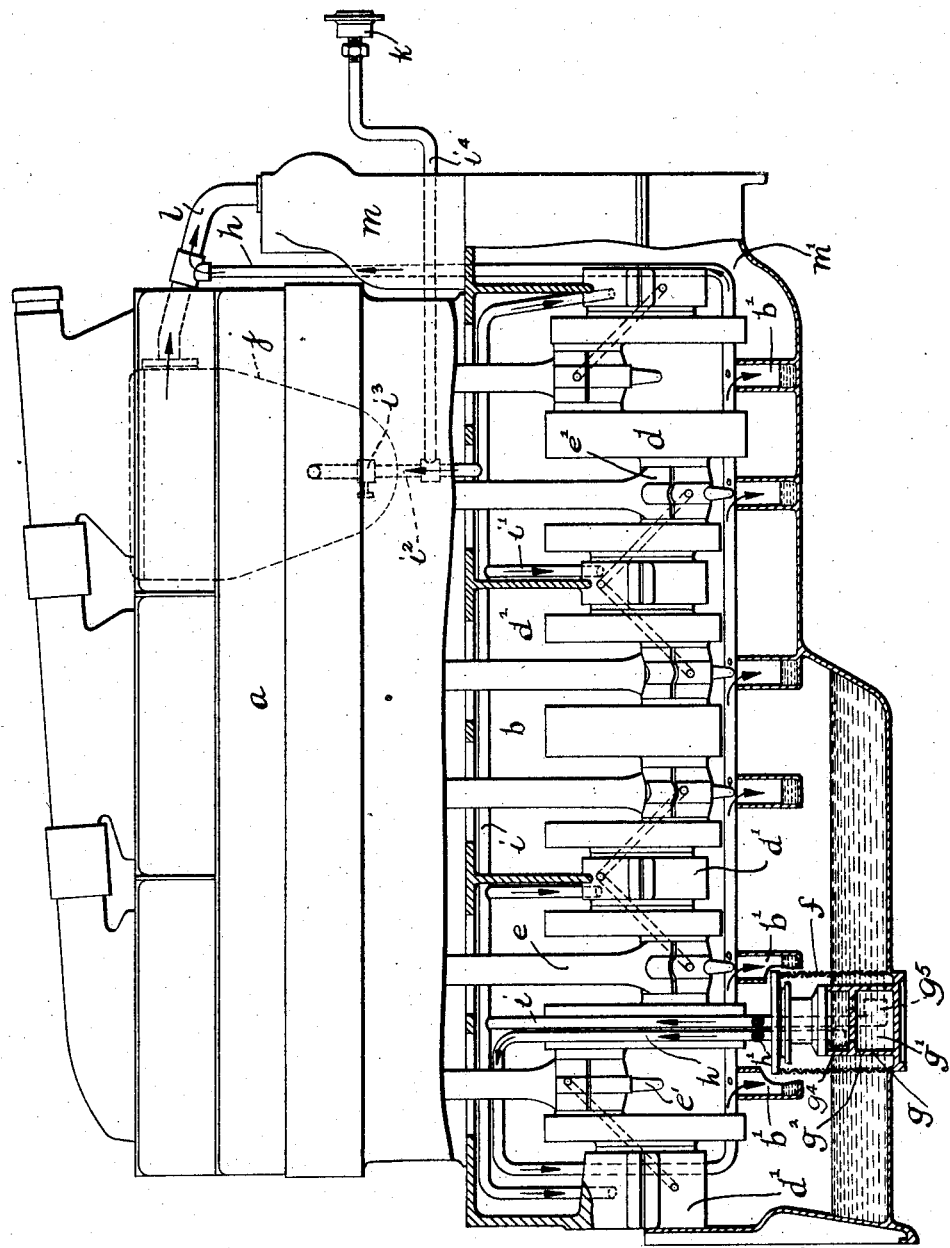
Inventor
ALFRED F MASURY
By his Attorneys Patented June 26, 1928.

1,674,685

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

OILING SYSTEM FOR INTERNAL-COMBUSTION ENGINES.

Application filed October 15, 1925. Serial No. 62,500.

This invention relates to oiling systems for internal combustion engines and has for its object to provide a system having independent oiling means for the moving parts of the engine in order that should a breakdown occur in one of the oiling means the lubrication of the engine may still be effected. To this end a splash lubricating system is provided supplied by a pump in the oil reservoir of the engine and a complete pressure oiling system is also provided supplied by an independent pump from the reservoir. More particularly the pumps may be of the gear type and may be driven by the same drive shaft and be contained in separate compartments of the same housing, means being provided whereby the outlet of either of the pumps may be closed and reliance for the lubrication of the engine paced upon the other pump. In order that the invention may be clearly understood and readily carried into effect the same will now be described more fully with reference to the accompanying drawing illustrating partly in vertical section and partly in side elevation, an internal combustion engine in which the dual oiling system is applied.

The water jacket enclosing the cylinders is indicated as a whole at $a$ and beneath the cylinders is disposed as is usual a crank shaft chamber $b$ formed in the lowermost portion thereof with a reservoir $c$ wherein the lubricating medium may collect. Disposed within the crank shaft chamber $b$ is the crank shaft $d$ supported in a plurality of bearings $d'$ and adapted to actuate the connecting rods $e$. In the oil reservoir $c$, and preferably surrounded by a screen $f$ is a housing $g$ formed with separate chambers $g'$, $g^2$ disposed one above the other but having a common inlet or interconnection $g^3$ whereby both chambers may be at all times in communication. With the housing in the reservoir $c$ there is adapted to be disposed within the chambers $g'$ and $g^2$ gear pumps $g^4$ and $g^5$, respectively, disposed, if desired, upon the same vertical shaft. These gear pumps and shaft are not shown as they may take any desired form. Leading from the uppermost chamber $g^2$ there is illustrated a conduit $h$ controlled by a valve $h'$ and adapted to conduct lubricant from the pump chamber $g^2$ to a plurality of oil troughs $b'$. These oil troughs are adapted to receive arms $e'$ which serve to splash the lubricant on the moving parts of the engine in the usual manner. It will be noted that the conduit $h$ after it leaves the last oil trough $b'$ is directed upwardly and connects with a lubricant manifold leading to the spiral gear case at the front of the engine in a manner which will be more fully described hereinafter.

From the lowermost housing $g'$ the lubricant is conducted through the conduit $i$ to the main bearings $d'$ through the instrumentality of a plurality of branch ducts $i'$. The connecting rod bearings $e^2$ also receive lubricant through this pressure system by branch passages $d^2$ drilled in the crank shaft. The excess pressure oil from the conduit $i$ is conducted to an oil cleaner $j$ through an outlet passage $i^2$ provided with an oil pressure lubricator $i^3$. A pipe $i^4$ may also be connected to the passage $i^2$ for communication with an oil gauge $k$ whereby the pressure existing in the system may be indicated to the operator of the engine. A manifold $l$ leads out of the upper part of the oil cleaner $j$ and it is with this manifold that the vertical portion of the oil conduit $h$ communicates for the purpose of conducting the excess splash oil to the spiral gears disposed within the spiral gear housing $m$ from whence the lubricant flows through the passage $m'$ to the crank case and finds its way into the oil reservoir $c$. It will thus be seen that a lubricating system for an internal combustion engine has been provided which is to all intents and purposes two independent systems of oiling, namely, a splash lubricating system with pump-over features and a complete pressure oiling system. These two systems have no interconnection between them except that both of the gear pumps may, if desired, be driven by the same drive shaft and may be contained in the same housing although in separate chambers therein and have the same inlet. The outlet of either pump is controlled in order to permit the operation of one lubricating system while the other is discontinued. Such a system as has hereinbefore been described is particularly advantageous, in that, should a breakdown occur in one system the other system will operate. A further important advantage resulting from the present improved oiling system is that the splash system for the present day engine will only operate satisfactorily up to, say 1,500 revolutions and when speeds higher than this are attained a pressure system is requisite in order to insure sufficient lubrication at the crank shaft bearings.

Various modifications may be made in the form and disposition of the component elements going to make up the invention as a whole since changes in the form of the engine to which the system is applied may require a rearrangement of the illustrated embodiment and no limitation is intended by the foregoing description or illustration except as indicated in the accompanying claims.

What I claim is:

1. In a lubricating system for an internal combustion engine having a crank shaft and bearings therefor and gearing associated with the crank shaft, a reservoir for the lubricant, a housing for the gearing communicating with the reservoir, a housing disposed in the reservoir and formed with a plurality of interconnected chambers communicating with the reservoir, pumps disposed within the chambers of the second named housing, respectively, a conduit to conduct lubricant from one of said chambers to the troughs and to the first named housing, a valve in said conduit proximate its point of connection with the chamber, a conduit to conduct lubricant from another of said chambers directly to the bearings and to the first named housing, and a valve in said second named conduit proximate its point of connection with the chamber.

2. In a lubricating system for an internal combustion engine having a crank shaft and bearings therefor and gearing associated with the crank shaft, a reservoir for the lubricant, a housing for the gearing communicating with the reservoir, a housing disposed in the reservoir and formed with a plurality of interconnected chambers communicating with the reservoir, pumps disposed within the chambers of the second named housing, respectively, a conduit to conduct lubricant from one of said chambers to the troughs and to the first named housing, a valve in said conduit proximate its point of connection with the chamber, a conduit to conduct lubricant from another of said chambers directly to the bearings and to the first named housing, a valve in said second named conduit proximate its point of connection with the chamber and lubricant cleansing means interposed in the second named conduit.

3. In a lubricating system for an internal combustion engine having a crank shaft and bearing therefor and gearing associated with the crank shaft, a reservoir for the lubricant, a housing for the gearing communicating with the reservoir, a housing disposed in the reservoir and formed with a plurality of interconnected chambers communicating with the reservoir, pumps disposed within the chambers of the second named housing, respectively, a conduit to conduct lubricant from one of said chambers to the troughs and to the first named housing, a valve in said conduit proximate its point of connection with the chamber, a conduit to conduct lubricant from another of said chambers directly to the bearings and to the first named housing, a valve in said second named conduit proximate its point of connection with the chamber, lubricant cleansing means interposed in the second named conduit, and lubricant pressure indicating means connected with the second named conduit.

4. In a lubricating system for an internal combustion engine, a reservoir for the lubricant, two pumps in the reservoir disposed at different levels, separate outlets from the respective pumps, separate means to cause lubricant from the outlets to reach the same bearings, an inlet for the lower pump below the surface of the oil in the reservoir, and means for causing the upper pump to take oil from the inlet of the lower pump.

This specification signed this 8th day of October, A. D. 1925.

ALFRED F. MASURY.